(12) United States Patent
Morikoshi

(10) Patent No.: US 10,542,683 B2
(45) Date of Patent: Jan. 28, 2020

(54) EMITTER AND DRIP IRRIGATION TUBE

(71) Applicant: Enplas Corporation, Saitama (JP)

(72) Inventor: Daisuke Morikoshi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 137 days.

(21) Appl. No.: 15/577,142

(22) PCT Filed: May 17, 2016

(86) PCT No.: PCT/JP2016/064595
§ 371 (c)(1),
(2) Date: Nov. 27, 2017

(87) PCT Pub. No.: WO2016/190168
PCT Pub. Date: Dec. 1, 2016

(65) Prior Publication Data
US 2018/0177145 A1 Jun. 28, 2018

(30) Foreign Application Priority Data
May 28, 2015 (JP) .................................. 2015-108622

(51) Int. Cl.
*A01G 25/02* (2006.01)
*A01G 25/16* (2006.01)

(52) U.S. Cl.
CPC ......... *A01G 25/023* (2013.01); *A01G 25/026* (2013.01); *A01G 25/16* (2013.01)

(58) Field of Classification Search
CPC .... A01G 25/02; A01G 25/006; A01G 25/023; A01G 25/026; A01G 25/16; Y02A 40/237

(Continued)

(56) References Cited

U.S. PATENT DOCUMENTS

| 6,027,048 A | 2/2000 | Mehoudar | |
|---|---|---|---|
| 2004/0164185 A1* | 8/2004 | Giuffre | A01G 25/023 239/542 |
| 2013/0248616 A1* | 9/2013 | Ensworth | A01G 25/026 239/11 |

FOREIGN PATENT DOCUMENTS

| EP | 1379123 A1 | 1/2004 |
|---|---|---|
| JP | 2010-046094 A | 3/2010 |

(Continued)

OTHER PUBLICATIONS

International Search Report from International Application No. PCT/JP2016/064595 dated Jul. 26, 2016.

(Continued)

*Primary Examiner* — Jason J Boeckmann
(74) *Attorney, Agent, or Firm* — Brundidge & Slanger, P.C.

(57) ABSTRACT

This emitter (120) has double ridges provided around a hole (173) which forms a portion of a flow path between a reduced-pressure flow path and a discharge part. A first ridge (174), which is the outermost ridge, is provided with four first grooves (177) which intersect said ridge. A second ridge (175) is provided with one second groove (178) which intersects said ridge. As the external liquid pressure increases, a film (140) sequentially adheres to the first ridge (174) and the second ridge (175). The flow rate of an irrigation liquid is adjusted to an amount capable of passing through the groove or grooves in the ridge to which the film (140) is adhered.

8 Claims, 10 Drawing Sheets

(58) Field of Classification Search
USPC .......................................................... 239/542
See application file for complete search history.

(56) References Cited

FOREIGN PATENT DOCUMENTS

| | | |
|---|---|---|
| JP | 2015-62369 A | 4/2015 |
| WO | 02/085101 A1 | 10/2002 |

OTHER PUBLICATIONS

Extended European Search Report for 16799874.9 dated Jan. 2, 2019.

* cited by examiner

EMITTER AND DRIP IRRIGATION TUBE

TECHNICAL FIELD

The present invention relates to an emitter and a drip irrigation tube including the emitter.

BACKGROUND ART

Conventionally, a drip irrigation method is known as a method for culturing plants. In the drip irrigation method, a drip irrigation tube is disposed on the soil where plants are planted, and irrigation liquid such as water and liquid fertilizer is dropped from the drip irrigation tube to the soil. The drip irrigation method has been increasingly attracting attention in recent years since the method can minimize the consumption rate of the irrigation liquid.

Normally, the drip irrigation tube includes a tube in which a plurality of through holes for discharging irrigation liquid are formed, and a plurality of emitters (also referred to as "drippers") for discharging irrigation liquid from respective through holes. In addition, as the emitter, emitters which are joined on the inner wall surface of the tube (see, for example, PTL 1), and emitters which are inserted to the tube from the exterior of the tube are known.

PTL 1 discloses an emitter configured to be joined on the inner wall surface of a tube. The emitter disclosed in PTL 1 includes a first member including a water intake port for intake of irrigation liquid, a second member including an outlet for discharging the irrigation liquid, and a film member disposed between the first member and the second member. On the inside of the first member, a valve seat part disposed to surround the water intake port and a pressure reducing groove that serves as a part of a pressure reduction channel are formed. In the film member, a through hole is formed at a position corresponding to the downstream end of the pressure reducing groove.

When the first member, the film member and the second member are stacked, the pressure reduction channel is formed, and the film member makes contact with the valve seat part to close the water intake port. In addition, a channel for carrying the irrigation liquid from the water intake port to the outlet is formed.

In the emitter disclosed in PTL 1, when the pressure of the irrigation liquid in the tube is equal to or greater than a predetermined pressure, the film member closing the water intake port is pushed by the irrigation liquid, and the irrigation liquid flows into the emitter. The pressure of the irrigation liquid proceeded into the emitter is reduced by the reduction channel, and the irrigation liquid is quantitatively discharged from the outlet.

CITATION LIST

Patent Literature

PTL 1
Japanese Patent Application Laid-Open No. 2010-046094

SUMMARY OF INVENTION

Technical Problem

In the drip irrigation tube using the emitter disclosed in PTL 1, however, the irrigation liquid flows into the emitter only when the pressure of the irrigation liquid in the tube is equal to or greater than the predetermined pressure. As a result, in some situation, the emitters do not function when the pressure of the irrigation liquid in the tube is significantly low. Consequently, there is a possibility that emitters disposed at a position remote from the liquid feed pump for sending the irrigation liquid to the tube do not appropriately function while emitters in a region near the liquid feed pump appropriately function. Accordingly, the discharge rate of the irrigation liquid from the emitters can vary depending on the watering positions, thus limiting the watering distance.

In addition, in the emitter disclosed in PTL 1, when the pressure of the irrigation liquid further increases from the predetermined pressure, the discharge rate of the irrigation liquid also increases, and the discharge rate of the irrigation liquid from the emitter exceeds the desired flow rate in some situation. In view of this, the emitter disclosed in PTL 1 has a room for improvement in terms of the control of the discharge rate when the pressure of the irrigation liquid is high.

An object of the present invention is to provide an emitter and a drip irrigation tube which can quantitatively discharge irrigation liquid even when the pressure of the irrigation liquid is low, and can suppress fluctuations of the discharge rate of the irrigation liquid when the pressure of the irrigation liquid is high.

Solution to Problem

Embodiments of the present invention provide an emitter configured to be joined on an inner wall surface of a tube for carrying irrigation liquid at a position corresponding to a discharging port communicating between inside and outside of the tube, the emitter being configured to quantitatively discharge the irrigation liquid in the tube from the discharging port to the outside of the tube, the emitter including: a water intake part for intake of the irrigation liquid in the tube; a first pressure reduction channel part for forming a first pressure reduction channel that allows the irrigation liquid received at the water intake part to flow therethrough while reducing a pressure of the irrigation liquid received at the water intake part; a discharge rate adjusting part for controlling a flow rate of the irrigation liquid supplied from the first pressure reduction channel in accordance with a pressure of the irrigation liquid in the tube; and a discharging part for housing the irrigation liquid supplied from the discharge rate adjusting part, the discharging part being configured to face the discharging port. The discharge rate adjusting part includes: a hole for communicating between the first pressure reduction channel and the discharging part, a plurality of projections surrounding an edge of the hole, at least one groove formed on each of the plurality of projections to traverse the each of the plurality of projections, and a film having flexibility, the film being disposed such that the film is separated from the plurality of projections and is capable of making close contact with the plurality of projections, the film sequentially makes close contact with the plurality of projections when the pressure of the irrigation liquid in the tube is equal to or greater than a set value, heights of the plurality of projections are set such that the film sequentially makes close contact with the plurality of projections, and the at least one groove is formed on each of the plurality of projections such that a total cross-sectional area of the at least one groove in each of the plurality of projections decreases in an order of close contact of the plurality of projections with the film.

In addition, embodiments of the present invention provide a drip irrigation tube including: the tube including the discharging port for discharging irrigation liquid; and the emitter joined on the inner wall surface of the tube at a position corresponding to the discharging port.

Advantageous Effects of Invention

According to the present invention, it is possible to provide an emitter and a drip irrigation tube which can quantitatively discharge irrigation liquid even when the pressure of the irrigation liquid is low, and can suppress fluctuations of the discharge rate of the irrigation liquid when the pressure of the irrigation liquid is high.

DESCRIPTION OF EMBODIMENTS (First Embodiment)
A first embodiment of the present invention is described below in detail with reference to the accompanying drawings.

Figure 1A:
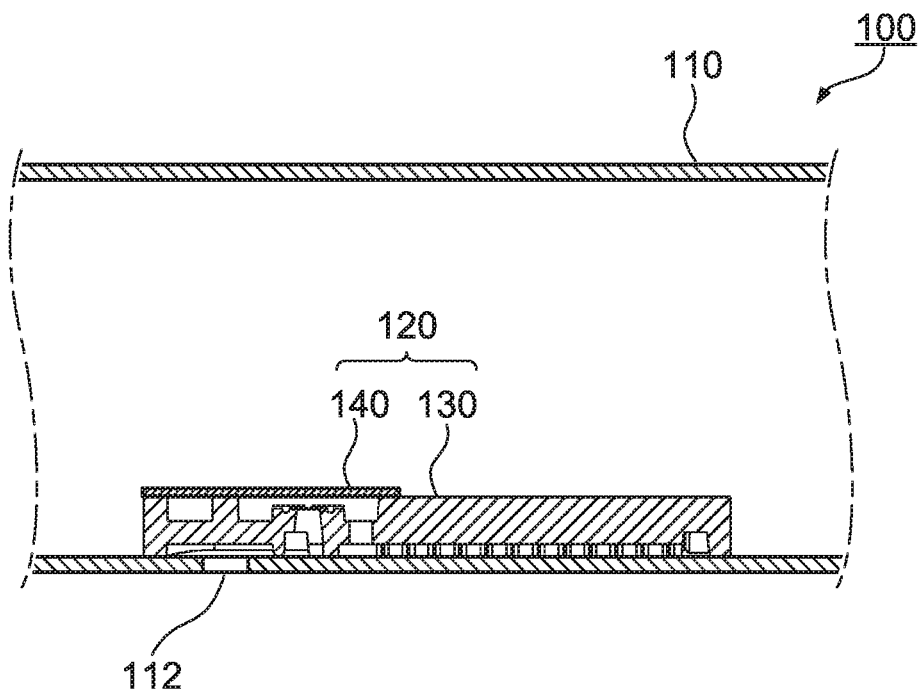
FIG. 1A is a sectional view in a direction along the axis of a drip irrigation tube according to a first embodiment of the present invention.
Figure 1B:
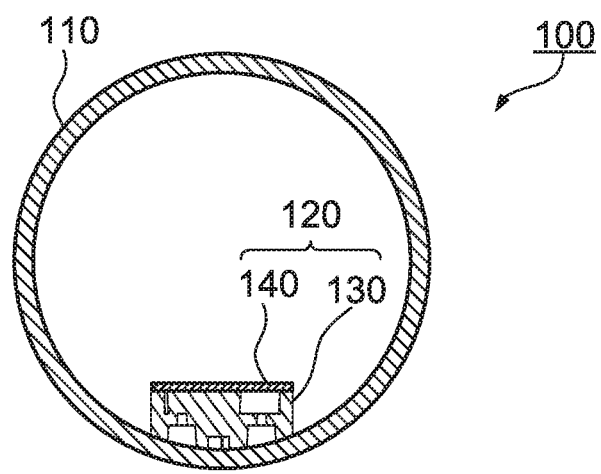
FIG. 1B is a sectional view in a direction perpendicular to the axis of the drip irrigation tube.

FIG. 1A is a sectional view along the axial direction of drip irrigation tube 100 according to the first embodiment of the present invention, and FIG. 1B is a sectional view in a direction perpendicular to the axis of drip irrigation tube 100. As illustrated in FIG. 1A and FIG. 1B, drip irrigation tube 100 includes tube 110 and emitter 120.

Tube 110 is a pipe for carrying irrigation liquid. The material of tube 110 is not limited. In the present embodiment, the material of tube 110 is polyethylene. The cross-sectional shape and the cross-sectional area of tube 110 in the direction perpendicular to the axis direction can be appropriately set as long as emitter 120 can be installed inside tube 110. In the wall of tube 110, a plurality of discharging ports 112 for discharging irrigation liquid are formed at a predetermined interval (for example, 200 to 500 mm) in the axis direction of tube 110. The diameter of the edge of discharging port 112 can be appropriately set as long as the irrigation liquid can be discharged at a desired flow rate, and is, for example, 1.5 mm Emitters 120 are joined at respective positions corresponding to discharging ports 112 of the inner wall surface of tube 110.

Emitter 120 is joined on the inner wall surface of tube 110 at the convex surface of emitter main body 130. Emitter 120 is joined to tube 110 by a publicly known method for example, and the examples of the way of joining emitter 120 to tube 110 include welding and/or fusing of a resin material of emitter 120 or tube 110, and bonding with an adhesive agent. Normally, discharging port 112 is formed after tube 110 and emitter 120 are joined to each other, and discharging port 112 may be formed before tube 110 and emitter 120 are joined to each other.

Figure 2A:
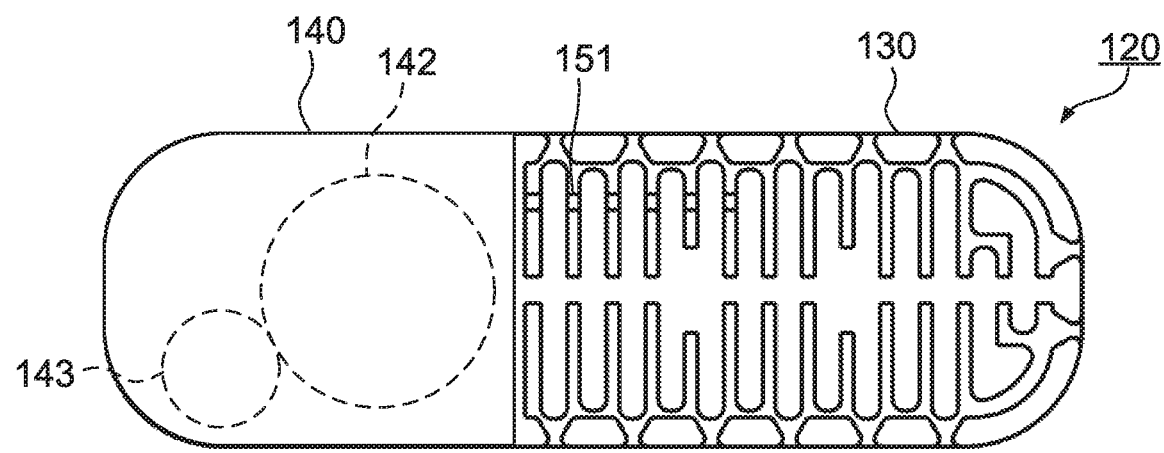
FIG. 2A is a plan view of the emitter according to the first embodiment.
Figure 2B:
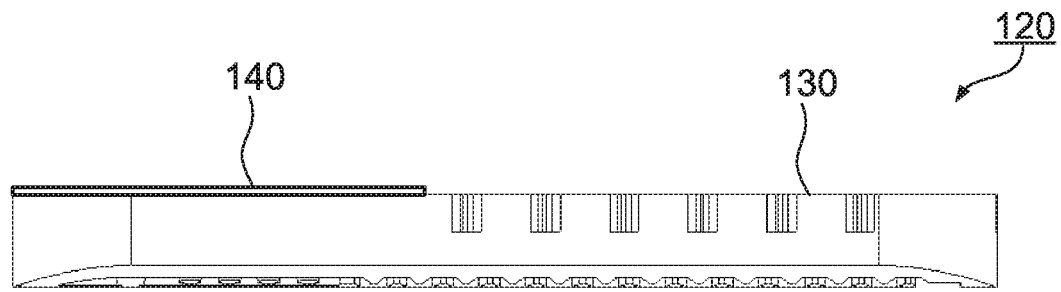
FIG. 2B is a front view of the emitter.
Figure 2C:
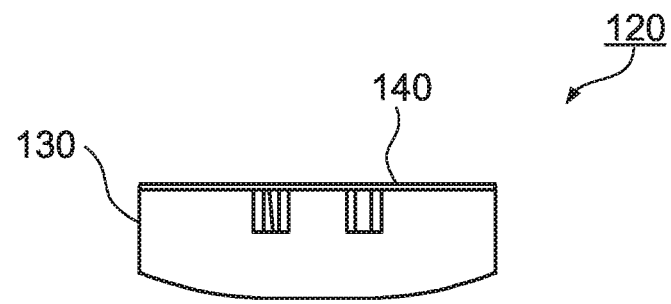
FIG. 2C is a right side view of the emitter.

FIG. 2A is a plan view of emitter 120, FIG. 2B is a front view of emitter 120, and FIG. 2C is a right side view of emitter 120. As illustrated in FIG. 2A to FIG. 2C, emitter 120 includes emitter main body 130, and film 140. Emitter main body 130 is composed of the above-mentioned convex surface (which is referred to also as "bottom surface") matching the inner wall surface of tube 110, a plane surface (which is referred to also as "top surface") located on the side opposite to the bottom surface, and recesses and through holes formed in these surfaces.

The size and the shape of emitter 120 can be appropriately set as long as a desired function can be ensured. For example, the planar shape of emitter 120 is a substantially rectangular shape with chamfered four corners, and emitter 120 has a long side length of 25 mm, a short side length of 8 mm, and a height of 2.5 mm.

Figure 3A:
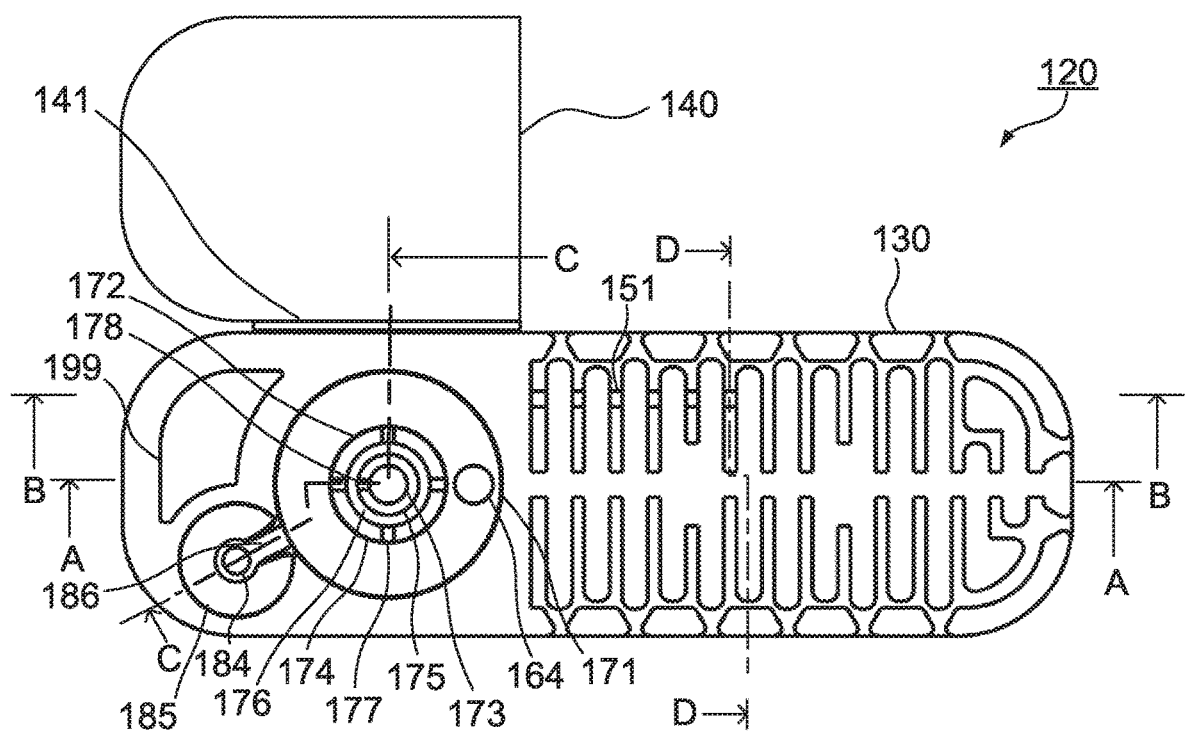
FIG. 3A is a plan view of the emitter according to the first embodiment before a film is joined.
Figure 3B:
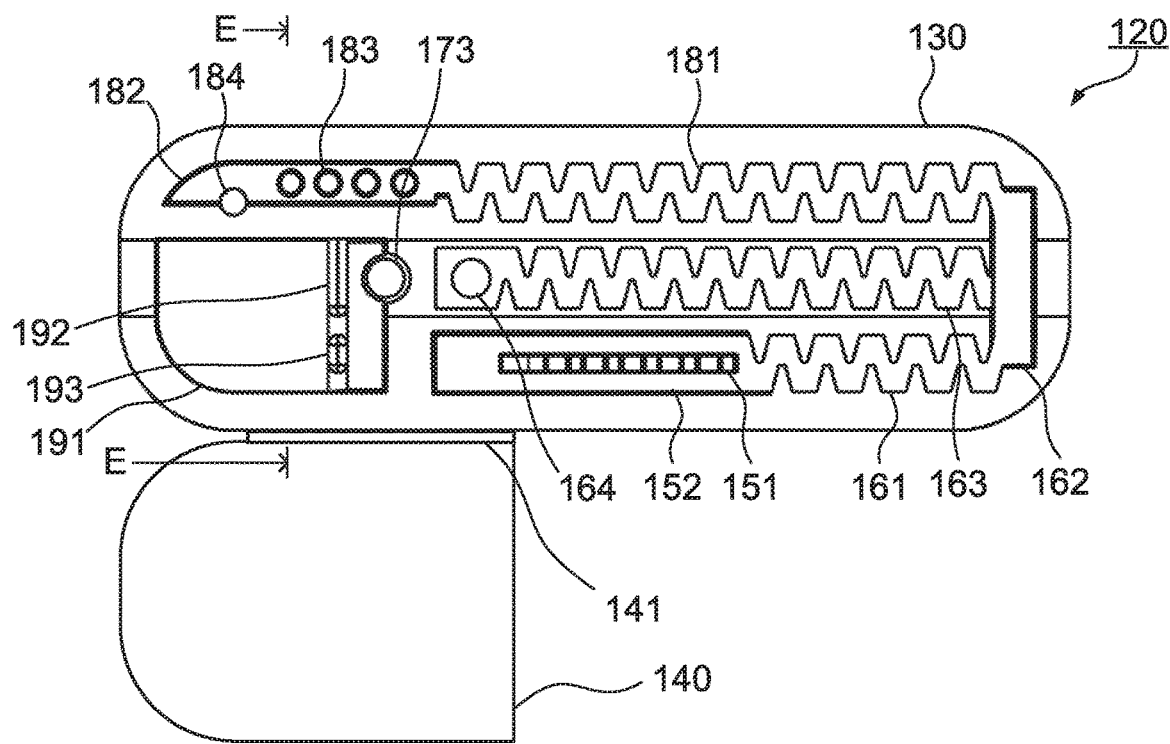
FIG. 3B is a bottom view of the emitter before the film is joined.
Figure 4A:
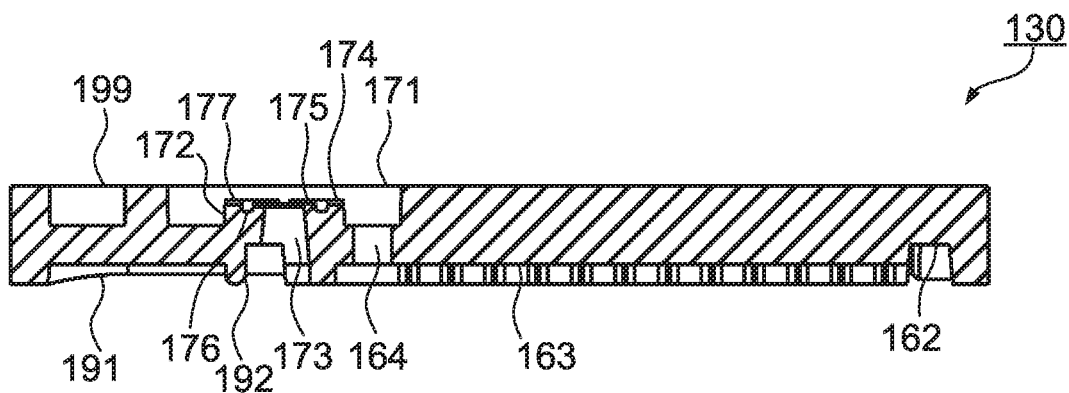
FIG. 4A is a cross-sectional view of an emitter main body of the first embodiment taken along line A-A of FIG. 3A.
Figure 4B:
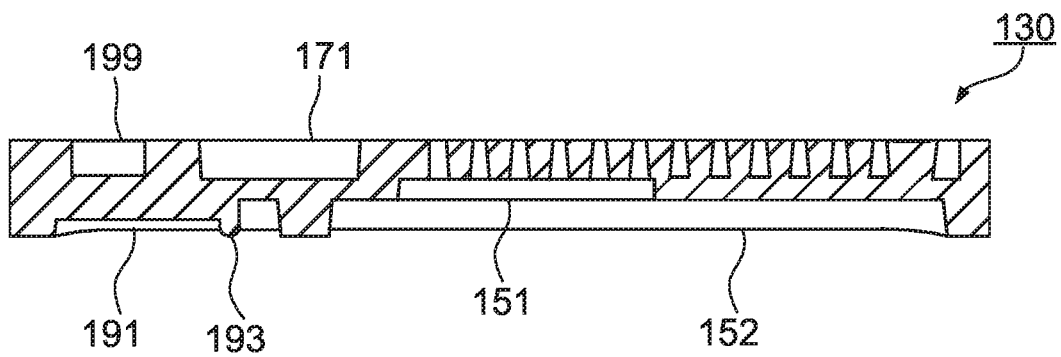
FIG. 4B is a cross-sectional view of the emitter main body taken along line B-B of FIG. 3A.
Figure 4C:
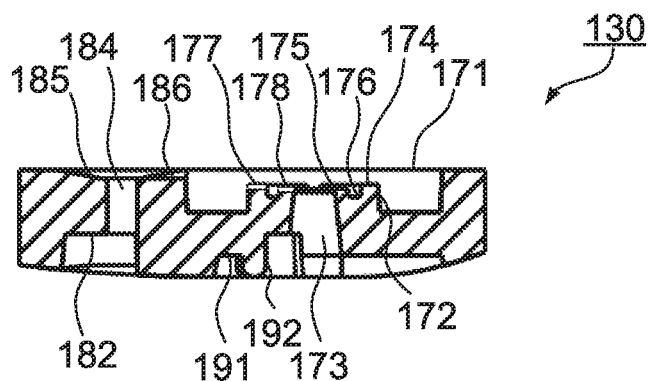
FIG. 4C is a cross-sectional view of the emitter main body taken along line C-C of FIG. 3A.
Figure 5A:
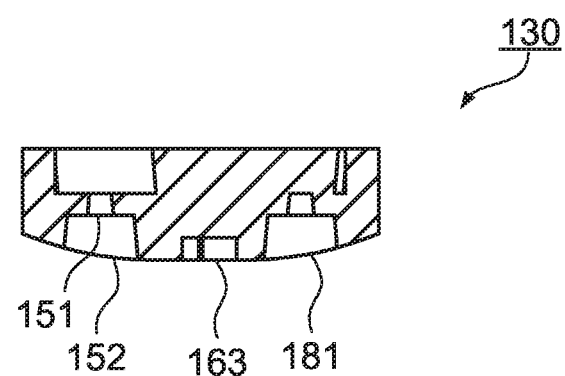
FIG. 5A is a cross-sectional view of the emitter main body of the first embodiment taken along line D-D of FIG. 3A.
Figure 5B:
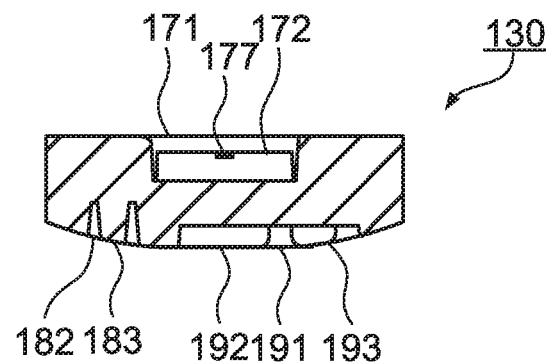
FIG. 5B is a cross-sectional view of the emitter main body taken along line E-E of FIG. 3B.

FIG. 3A is a plan view of emitter 120 before the joining of film 140, and FIG. 3B is a bottom view of emitter 120 before the joining of film 140. In addition, FIG. 4A is a cross-sectional view of emitter main body 130 taken along line A-A of FIG. 3A, FIG. 4B is a cross-sectional view of emitter main body 130 taken along line B-B of FIG. 3A, and FIG. 4C is a cross-sectional view of emitter main body 130 taken along line C-C of FIG. 3A. Further, FIG. 5A is a cross-sectional view of emitter main body 130 taken along line D-D of FIG. 3A, and FIG. 5B is a cross-sectional view of emitter main body 130 taken along line E-E of FIG. 3B.

As illustrated in FIG. 3A and FIG. 3B, emitter 120 is integrally molded with a resin material having flexibility. For example, film 140 is disposed integrally with emitter main body 130 through hinge part 141 at a side edge of emitter main body 130. When turned about hinge part 141, film 140 is disposed at a position where it covers the discharge rate adjusting part and the valve seat part. The thickness of film 140 is, for example, 0.3 mm.

The integrally molded product of emitter main body 130 and film 140 is produced by injection molding, for example. The resin material is a resin material having a desired flexibility when emitter main body 130 and film 140 are molded, and the examples of the material include polyethylene, polypropylene and silicone. In addition, the resin material may be an industrial material having rubber elasticity, and the examples of the material include elastomer and rubber.

Emitter main body 130 includes a water intake part for intake of the irrigation liquid in tube 110, a pressure reduction channel part for forming a pressure reduction channel that allows the irrigation liquid received at the water intake part to flow therethrough while reducing the pressure of the irrigation liquid, a discharge rate adjusting part for controlling the flow rate of the irrigation liquid supplied from the pressure reduction channel in accordance with the pressure of the irrigation liquid in tube 110 (which is also referred to simply as "outer liquid pressure"), a bypass channel part for forming a bypass channel that bypasses a part of the downstream side of the pressure reduction channel part and communicates between the upstream side of the discharge rate adjusting part and the water intake part, and a discharging part configured to face discharging port 112 and house the irrigation liquid supplied from the discharge rate adjusting part.

The water intake part includes a screen part, slit 151 to which the irrigation liquid past the screen part is supplied, and recess 152 configured to form a part of a channel of the irrigation liquid in emitter 120 and house the irrigation liquid past slit 151.

The screen part is minute recesses and projections formed in the top surface, and, roughly speaking, includes a first outer groove extending along the one end side edge of the top surface of emitter main body 130 in the longitudinal direction and having a U-like shape in plan view, a second outer groove that communicates between the first outer groove and the side of emitter main body 130, and a third outer groove extending to the first outer groove in the short direction of emitter main body 130 from the center portion of emitter main body 130 in the short direction. The second outer groove forms a plurality of projections extending along the edge of the top surface of emitter main body 130, and the third outer groove extends to the first outer groove from the center portion of emitter main body 130 in the short direction, and forms a plurality of slender projections in parallel with each other in the longitudinal direction. The corners of the planar shapes of the projections are appropriately chamfered.

Slit 151 is formed along the longitudinal direction across the second outer grooves, and opens to the second outer groove. Recess 152 is formed on the bottom surface of emitter main body 130, and has a substantially rectangular slender shape in the longitudinal direction in plan view. Slit 151 opens at the bottom of recess 152. That is, slit 151 communicates between the second outer groove and recess 152.

The pressure reduction channel part includes a first pressure reduction channel part 161 continuously connected with recess 152, recess 162 disposed on one end side of emitter main body 130 and continuously connected with first pressure reduction channel part 161, and second pressure reduction channel part 163 continuously connected with recess 162. Recess 162 is configured to form a part of a channel of the irrigation liquid in emitter 120.

First pressure reduction channel part 161 is a groove having a zigzag shape in plan view which is formed in one side part of the bottom surface. The zigzag shape is a shape in which projections, each having a nearly triangular prism shape, are alternately disposed along the longitudinal direction from the side surfaces of first pressure reduction channel part 161, for example In plan view, the projections are disposed such that the tip of each projection does not exceed the central axis between the side surfaces. For example, the length of first pressure reduction channel part 161 is 6.5 mm, the depth of first pressure reduction channel part 161 is 0.5 mm, and the width of the channel of first pressure reduction channel part 161 (the distance between opposite side surfaces at opposite projections) is 0.5 mm.

Recess 162 is a recess formed on the bottom surface, and has a substantially rectangular slender shape in the short direction of emitter 120 in plan view. The depth of recess 162 is, for example, 0.5 mm, and the width of recess 162 is, for example, 1.0 mm.

Second pressure reduction channel part 163 is disposed along the longitudinal direction of emitter main body 130 at a center portion on the bottom surface. Second pressure reduction channel part 163 is formed similarly to first pressure reduction channel part 161. The length of second pressure reduction channel part 163 is, for example, 13 mm Hole 164 opens at an end of second pressure reduction channel part 163.

The discharge rate adjusting part includes columnar recess 171 formed on the top surface, columnar projection 172 raised from the bottom surface of recess 171, hole 173 opening at the center of projection 172 and communicated with the discharging part, first projection 174 and second projection 175 each surrounding the edge of hole 173, first groove 177 formed to traverse first projection 174, and second groove 178 formed to traverse second projection 175. First projection 174 is separated from second projection 175, and accordingly recess 176 is formed between first projection 174 and second projection 175.

In addition, the discharge rate adjusting part includes film 140. Film 140 has flexibility, and is disposed such that film 140 is separated from first projection 174 and second projection 175 but can make close contact with first valve seat part 174 and second projection 175. Hole 164 opens at the bottom of recess 171. That is, hole 164 communicates between second pressure reduction channel part 163 and recess 171.

Both first projection 174 and second projection 175 are projections each having an annular shape in plan view and disposed on the top surface of projection 172. First projection 174 is a projection on the outer side, and second projection 175 is a projection on the inner side. First projection 174 is higher than second projection 175. For example, the distance between the top surface of emitter main body 130 (the bottom surface of first diaphragm part 142 described later) and the top surface of first projection 174 is 0.35 mm, and the distance between the top surface of emitter main body 130 and the top surface of second projection 175 is 0.45 mm. In addition, the width of first projection 174 is 0.4 mm, the width of second projection 175 is 0.3 mm, and the distance between the center of first projection 174 in the width direction and the center of second projection 175 in the width direction is 0.65 mm. With this configuration, recess 176 is formed as the gap between first projection 174 and second projection 175.

Four first grooves 177 are formed at even intervals. One second groove 178 is formed. For example, first groove 177 and second groove 178 have identical sizes with a depth of 0.1 mm, and a width of 0.3 mm. The total cross-sectional area of first grooves 177 in first projection 174 is four times the total cross-sectional area of second groove 178 in second projection 175. In this manner, first groove 177 and second groove 178 are formed on first projection 174 and second projection 175 such that the total cross-sectional area of the groove in one projection decreases in the order of the close contact of the projections with film 140.

On the bottom surface side of emitter main body 130, the bypass channel part includes third pressure reduction channel part 181 continuously connected with recess 162, and groove 182 continuously connected with third pressure reduction channel part 181 and configured to form a communication channel. Third pressure reduction channel part 181 is formed along the longitudinal direction in the other side part of emitter main body 130. Third pressure reduction channel part 181 is formed similarly to first pressure reduction channel part 161. The length of third pressure reduction channel part 181 is, for example, 14.5 mm.

Groove 182 is continuously connected with an end of third pressure reduction channel part 181, and includes a plurality of columnar projections 183 raised from the bottom groove 182. Hole 184 opens at an end portion of groove 182.

On the top surface side of emitter main body 130, the bypass channel part includes valve seat part 185 recessed from the top surface, and guide groove 186. Valve seat part 185 is a cone-shaped depression having a circular shape in plan view. The outer edge of valve seat part 185 is in contact with recess 171. Valve seat part 185 includes a bottom surface, and the bottom surface is a plane surface having a circular shape in plan view. With this configuration, valve seat part 185 has a depth from the top surface of emitter main body 130 to the bottom surface, and the depth of valve seat part 185 is smaller than the depth from the top surface of emitter main body 130 to the top of first valve seat part 174. Hole 184 opens at the bottom surface. That is, hole 184 communicates between groove 182 and valve seat part 185.

Guide groove 186 is continuously connected with the outer edge of the bottom surface, thus communicating between valve seat part 185 and recess 171. The width of guide groove 186 is constant, and is, for example, 0.6 mm. The depth of guide groove 186 from the top surface of emitter main body 130 is constant, and is identical to the depth of valve seat part 185.

The discharging part includes recess 191 formed on the bottom surface of emitter main body 130, and main-projection 192 and sub-projection 193 raised from the bottom surface of recess 191. The planar shape of recess 191 is a substantially rectangular shape. Hole 173 opens at a center portion of an edge of recess 191 in the short direction of emitter main body 130. That is, hole 173 communicates between recess 171 and recess 191.

Each of main-projection 192 and sub-projection 193 has a height equal to the depth of recess 191 from the bottom surface of emitter main body 130. Main-projection 192 extends from a side surface of recess 191 along the short direction of emitter main body 130, and is disposed at a position overlapping hole 173 as viewed along the longitudinal direction of emitter main body 130. Sub-projection 193 is disposed at a position between an end of main-projection 192 and a side surface of recess 191 without making contact with the end of main-projection 192 or the side surface of recess 191.

In addition, thickness-reducing recess 199 is formed on the top surface of emitter main body 130.

Emitter 120 is configured by turning film 140 about the hinge part, and joining the film 140 to the top surface of emitter main body 130. Various publicly-known methods may be employed to join film 140 to emitter main body 130, and the examples of the methods include welding or fusing of film 140, and bonding with an adhesive agent. When film 140 is joined to emitter main body 130, recess 171 of the discharge rate adjusting part and valve seat part 185 of the bypass channel part are sealed with film 140 at the upper end edges thereof, and thus a space of the channel for irrigation liquid is formed. In the following description, the portion which seals recess 171 in film 140 is referred to also as first diaphragm part 142 (see FIG. 2A), and the portion which seals valve seat part 185 in film 140 is referred to also as second diaphragm part 143 (see FIG. 2A).

It is to be noted that hinge part 141 may be removed from emitter 120 after film 140 is joined to emitter main body 130. In addition, film 140 and emitter main body 130 may be separate members, and emitter 120 may be configured by joining such a separated film 140 to emitter main body 130.

Emitter 120 can be disposed at a predetermined position on the inner wall surface of tube 110 by fusing emitter 120 at a desired position thereof at the time of shaping tube 110, for example. In this manner, drip irrigation tube 100 is configured. When emitter 120 is joined to the inner wall surface of tube 110, the bottom surface of emitter main body 130 is sealed with tube 110. As a result, recess 152 of the water intake part serves as a part of a channel of the irrigation liquid in emitter 120, which houses the irrigation liquid past slit 151.

In addition, first pressure reduction channel part 161, recess 162 and second pressure reduction channel part 163 of the pressure reduction channel part serve as the pressure reduction channel for allowing the irrigation liquid received from a water intake part to flow to the discharge rate adjusting part while reducing the pressure of the irrigation liquid. In addition, third pressure reduction channel part 181 of the bypass channel part serves as another pressure reduction channel for allowing the irrigation liquid received from a water intake part to flow to valve seat part 185 while reducing the pressure of the irrigation liquid, and, groove 182 of the bypass channel part serves as a communication channel that communicates between the other pressure reduction channel and valve seat part 185. Thus, the bypass channel part serves as a bypass channel that bypasses a part the downstream side of the pressure reduction channel part and communicates between the upstream side of the discharge rate adjusting part and the water intake part.

Further, recess 191 of the discharging part forms a space for housing the irrigation liquid supplied from the discharge rate adjusting part, and main-projection 192 and sub-projection 193 are joined to tube 110 at the tops thereof, thus forming an intrusion preventing part for preventing intrusion of foreign matters into discharging port 112. It is to be noted that hole 173 of the discharge rate adjusting part projection 172 communicates between the pressure reduction channel and the discharging part through recess 171 and hole 164.

Next, flow of irrigation liquid in drip irrigation tube 100 is roughly described. First, irrigation liquid is fed into tube 110. Examples of the irrigation liquid include water, liquid fertilizer, agricultural chemicals and mixtures thereof. The feeding pressure of the irrigation liquid to drip irrigation tube 100 is 0.1 MPa or lower in view of simple implementation of the drip irrigation method and prevention of damaging of tube 110 and emitter 120, for example.

The irrigation liquid in tube 110 is supplied into emitter 120 through the first and third outer grooves of the screen part. Floating matters in the irrigation liquid are captured by the recesses and projections of the screen part, and thus the irrigation liquid from which the floating matters are removed passes through the slit.

It is to be noted that by forming the first and third outer grooves into shapes whose width increases toward the depth side such that the recesses and projections are configured in a so-called wedge wire structure, it is possible to further suppress the liquid pressure drop at the time of intake of the irrigation liquid into emitter 120.

The irrigation liquid supplied into emitter 120 passes through the pressure reduction channel of first pressure reduction channel part 161 while its pressure being reduced. Then, on one hand, the irrigation liquid passes through the pressure reduction channel of second pressure reduction channel part 163 while its pressure being reduced and is supplied to recess 171 of the discharge rate adjusting part through hole 164, and on the other hand, the irrigation liquid passes through another pressure reduction channel of third pressure reduction channel part 181 while its pressure being reduced, and is supplied to valve seat part 185 through the communication channel and hole 184.

The irrigation liquid supplied to recess 171 of the discharge rate adjusting part fills recess 171, and goes over first projection 174 and second projection 175 on projection 172 so as to be supplied to the discharging part through first groove 177 and second groove 178, and hole 173. Meanwhile, the irrigation liquid supplied to valve seat part 185 is supplied to recess 171 through guide groove 186, and is finally supplied to the discharging part through hole 173.

The irrigation liquid supplied to the discharging part is discharged to the outside of tube 110 from the discharging port of tube 110 that opens to recess 191.

Figure 6A:
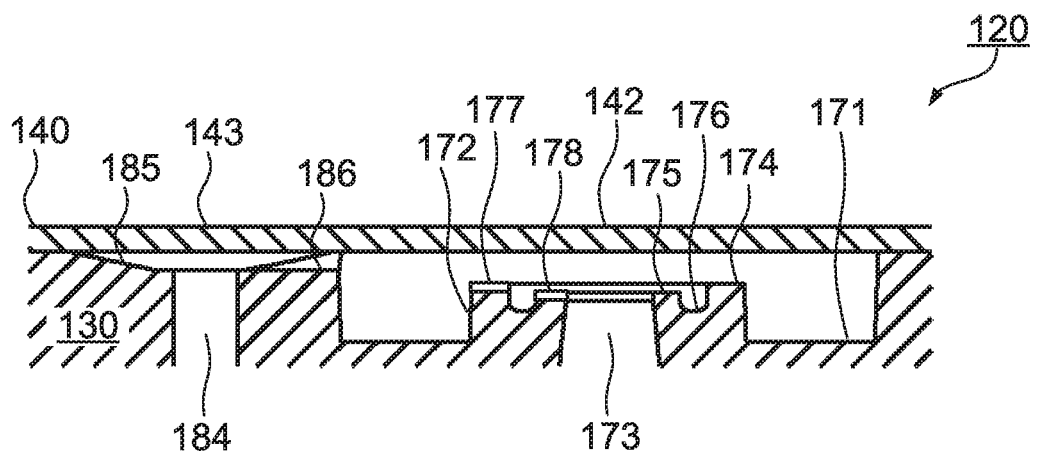
FIG. 6A schematically illustrates a part of a cross section of the emitter according to the first embodiment taken along line C-C of FIG. 3A in the case where the outer liquid pressure is sufficiently low, and FIG. 6B schematically illustrates a part of a cross section of the emitter taken along line C-C of FIG. 3A in the case where the outer liquid pressure is equal to or greater than a first set value.
Figure 6B:
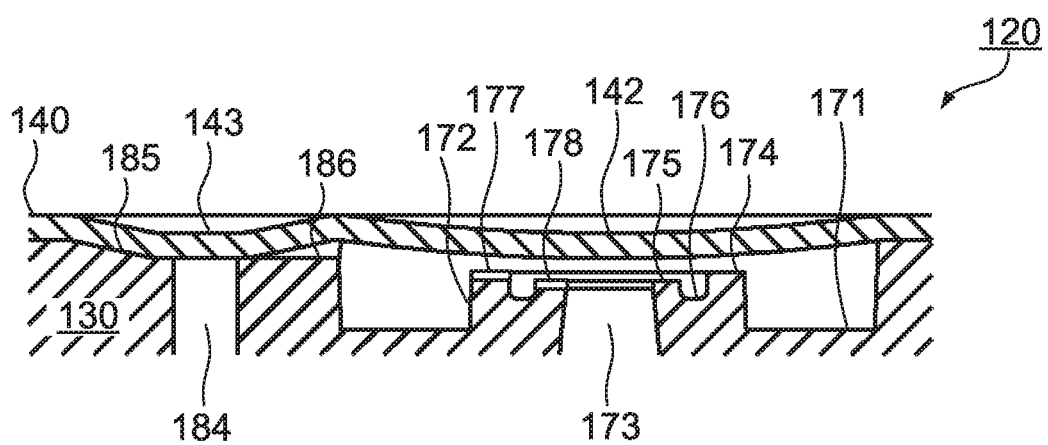

Next, the control of the flow rate of the irrigation liquid in the bypass channel and the discharge rate adjusting part under the outer liquid pressure is described. FIG. 6A schematically illustrates a part of a cross section of emitter 120 taken along line C-C of FIG. 3A in the case where the outer liquid pressure is sufficiently low, and FIG. 6B schematically illustrates a part of a cross section of emitter 120 taken along line C-C of FIG. 3A in the case where the outer liquid pressure is equal to or greater than a first set value. In addition, FIG. 7A schematically illustrates a part of a cross section of emitter 120 taken along line C-C of FIG. 3A in the case where the outer liquid pressure is equal to or greater than a second set value, and FIG. 7B schematically illustrates a part of a cross section of emitter 120 taken along line C-C of FIG. 3A in the case where the outer liquid pressure is equal to or greater than a third set value.

When the outer liquid pressure is sufficiently low (for example, 0.01 MPa), first diaphragm part 142 and second diaphragm part 143 are slightly deflected or neither of them is deflected, and, as illustrated in FIG. 6A, projection 172 and hole 173 of the discharge rate adjusting part, and hole 184 of the bypass channel are open. Accordingly, both the irrigation liquid from the pressure reduction channel and the irrigation liquid from the bypass channel are supplied to recess 171 of the discharge rate adjusting part, and the liquid is supplied to the discharging part from hole 173 and discharged from discharging port 112. The irrigation liquid from the bypass channel is smoothly supplied from valve seat part 185 to recess 171 through guide groove 186. When the outer liquid pressure increases, first diaphragm part 142 and second diaphragm part 143 of film 140 under the outer liquid pressure are gradually deflected and brought closer to projection 172 and valve seat part 185.

When the outer liquid pressure increases to the first set value (for example, 0.03 MPa), both first diaphragm part 142 and second diaphragm part 143 are largely deflected. Since valve seat part 185 is located at a position shallower than the first projection and the second projection of the discharge rate adjusting part in the bypass channel, second diaphragm part 143 is brought into close contact with valve seat part 185 and is sealed with hole second diaphragm part 143 as illustrated in FIG. 6B. In this manner, the bypass channel is closed and supply of the irrigation liquid from the bypass channel to the recess is stopped. As a result, only the irrigation liquid from the pressure reduction channel is supplied to the recess, and the irrigation liquid is discharged from the discharging port only by the rate of the irrigation liquid supplied from the pressure reduction channel In the discharge rate adjusting part, first diaphragm part 142 is brought closer to first projection 174 and second projection 175 but not brought into contact with first projection 174 or second projection 175 as illustrated in FIG. 6B. Accordingly, when the outer liquid pressure is at the first set value, only adjustment of the flow rate of the irrigation liquid by closing the bypass channel is performed as described above. When the outer liquid pressure further increases from the first set value, the flow rate of the irrigation liquid in the pressure reduction channel increases, and the flow rate of the irrigation liquid which enters hole 173 from a space between first diaphragm part 142 and first projection 174, and second projection 175 increases.

Figure 7A:
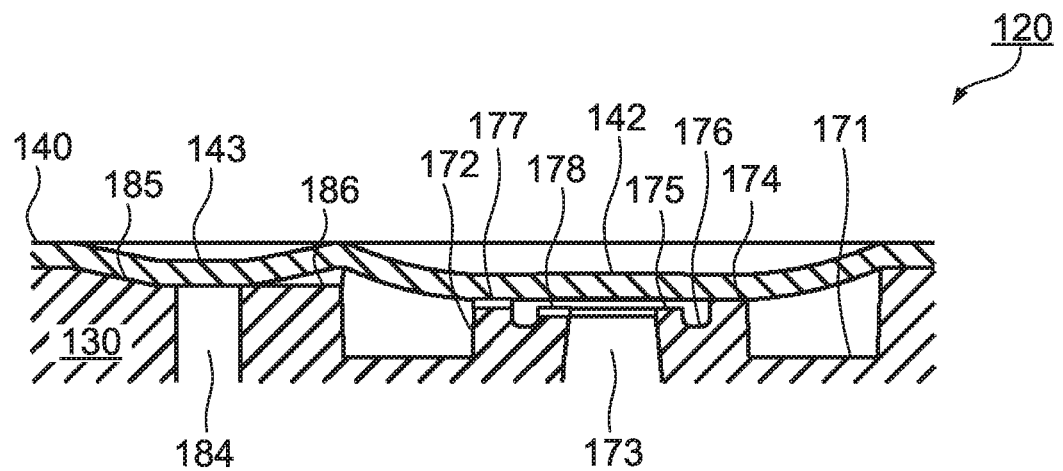
FIG. 7A schematically illustrates a part of a cross section of the emitter according to the first embodiment taken along line C-C of FIG. 3A in the case where the outer liquid pressure is equal to or greater than a second set value, and FIG. 7B schematically illustrates a part of a cross section of the emitter taken along line C-C of FIG. 3A in the case where the outer liquid pressure is equal to or greater than a third set value.
Figure 7B:
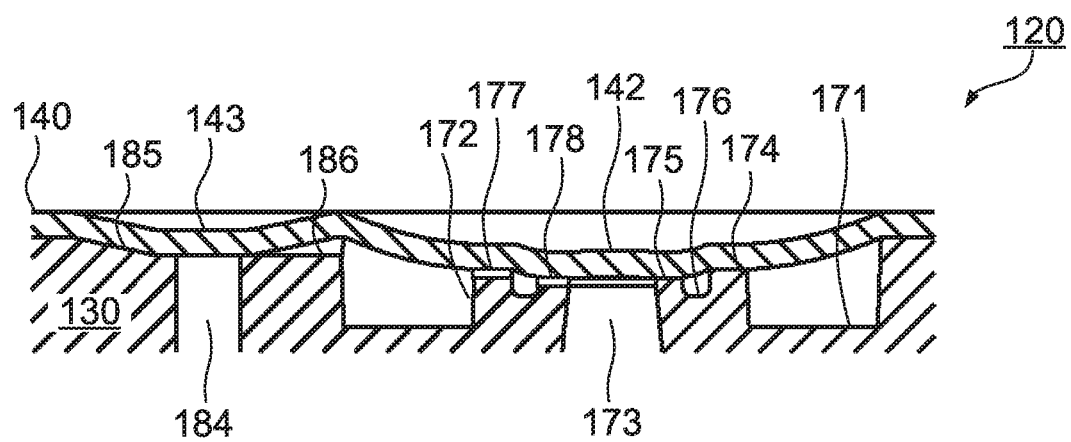

When the outer liquid pressure increases to the second set value (for example, 0.05 MPa), first diaphragm part 142 is more largely deflected, and in addition, since first projection 174 is higher than second projection 175, first diaphragm part 142 makes close contact with first projection 174 as illustrated in FIG. 7A. Since first groove 177 is formed on first projection 174, the irrigation liquid in the recess reaches hole 173 through first groove 177 and recess 176, and then through a gap between projection 172 and first diaphragm part 142, that is, a gap between second projection 178 and first diaphragm part 142 and second groove 178.

In this manner, when the outer liquid pressure is at the second set value, the flow rate of the irrigation liquid from the discharge rate adjusting part is reduced from the rate of the irrigation liquid entering from the space between first projection 174 and first diaphragm part 142 to the rate of the irrigation liquid which can pass through first groove 177, and finally the irrigation liquid is discharged from discharging port 112 only by the rate of the irrigation liquid which passes through first groove 177. When the outer liquid pressure further increases from the second set value, the flow rate of the irrigation liquid in the pressure reduction channel increases, and the flow rate of the irrigation liquid which passes through first groove 177 gradually increases.

When the outer liquid pressure increases to the third set value (for example, 0.16 MPa), first diaphragm part 142 is further largely deflected, and brought into close contact with first projection 174 and second projection 175 as illustrated in FIG. 7B. Since first groove 177 and second groove 178 are formed on first projection 174 and second projection 175, respectively, and recess 176 is formed between the projections, the irrigation liquid in recess 171 reaches hole 173 through first groove 177, recess 176 and second groove 178.

With this configuration, the heights of first projection 174 and second projection 175 are set such that first diaphragm part 142 sequentially makes close contact with first projection 174 and second projection 175 in this order, and thus first diaphragm part 142 sequentially makes close contact with first projection 174 and second projection 175 in this order when the outer liquid pressure is at the second set value and the third set value. When first diaphragm part 142 makes close contact with both first projection 174 and second projection 175, hole 173 is communicated with recess 171 not only through first groove 177 but also through second groove 178. Accordingly, when the outer liquid pressure is at the third set value, the flow rate of the irrigation liquid from the discharge rate adjusting part is reduced from the rate of the irrigation liquid entering from first groove 177 to the rate of the irrigation liquid which can pass through second groove 178, and finally, the irrigation liquid is discharged from discharging port 112 only by the rate of the irrigation liquid which passes through second groove 178. When the outer liquid pressure further increases from the third set value, the flow rate of the irrigation liquid in the pressure reduction channel further increases, and the flow rate of the irrigation liquid which passes through second groove 178 slightly increases.

In this manner, emitter 120 discharges the irrigation liquid from discharging port 112 by the rate of the irrigation liquid which passes through the bypass channel and the pressure reduction channel when the pressure of the irrigation liquid is sufficiently low, and discharges the irrigation liquid from discharging port 112 by the rate of the irrigation liquid which passes through second groove 178 when the pressure of the irrigation liquid is sufficiently high. When the pressure of the irrigation liquid increases, emitter 120 suppresses the increase of the discharge rate of the irrigation liquid from discharging port 112 to the rate of the irrigation liquid which passes through first groove 177, and thereafter suppresses the further increase of the discharge rate to the rate of the irrigation liquid which passes through second groove 178. That is, emitter 120 includes a mechanism that reduces, two times in the discharge rate adjusting part or three times when the bypass channel is included, the increase in flow rate of the irrigation liquid associated with the increase in outer liquid pressure. Accordingly, emitter 120 can handle higher outer liquid pressure to adjust the discharge rate of the irrigation liquid to a desired rate.

As is clear from the above description, emitter 120 is an emitter that is joined at a position corresponding to discharging port 112 of the inner wall surface of tube 110 and configured to quantitatively discharge the irrigation liquid in tube 110 to the outside of tube 110 from discharging port 112. Emitter 120 includes a water intake part for intake of the irrigation liquid in tube 110; a pressure reduction channel part for forming a pressure reduction channel that allows the irrigation liquid received at the water intake part to flow therethrough while reducing the pressure of the irrigation liquid; a discharge rate adjusting part for controlling the flow rate of the irrigation liquid supplied from the pressure reduction channel in accordance with the pressure of the irrigation liquid in tube 110; and a discharging part configured to house the irrigation liquid supplied from the discharge rate adjusting part, and configured to face discharging port 112. Further, the discharge rate adjusting part includes hole 173 for communicating between the pressure reduction channel and the discharging part, first projection 174 and second projection 175 surrounding the edge of hole 173, first groove 177 and second groove 178 formed on first projection 174 and second projection 175, respectively, to traverse the respective projections, and film 140 having flexibility and disposed separately from the projections in such a manner that film 140 can make close contact with the projections. Further, film 140 sequentially makes close contact with the projections when the pressure of the irrigation liquid in tube 110 is equal to or greater than a set value, the heights of the projections are set such that film 140 sequentially makes close contact with the projections, and first groove 177 and second groove 178 are formed on the respective projections such that the total cross-sectional area of the groove in one projection decreases in the order of the close contact of the projections with film 140. Accordingly, the irrigation liquid can be quantitatively discharged even when the pressure of the irrigation liquid is low, and fluctuations of the discharge rate of the irrigation liquid can be suppressed when the pressure of the irrigation liquid is high.

In addition, the configuration in which first groove 177 and second groove 178 have identical widths and identical depths, the height of first projection 174 on the outer side is equal to or greater than the height of second projection 175 on the inner side, and the number of the grooves in one projection is greater in first projection 174 on the outer side is further advantageous from the viewpoint of simply forming the adjustment mechanism of the flow rate of the irrigation liquid.

In addition, the configuration in which emitter 120 further includes a bypass channel part for forming a bypass channel that bypasses a part or all of the pressure reduction channel part and communicates between the water intake part and the upstream side of the discharge rate adjusting part, and the bypass channel part includes valve seat part 185 that can make close contact with film 140 under the pressure of the irrigation liquid in tube 110 to close the bypass channel is further advantageous from the viewpoint of increasing the discharge rate of the irrigation liquid under low pressure.

In addition, the configuration in which the bypass channel part further includes guide groove 186 for guiding the irrigation liquid supplied to valve seat part 185 to the upstream side of the discharge rate adjusting part is further advantageous from the viewpoint of smoothly supplying the irrigation liquid from the bypass channel to the discharge rate adjusting part.

In addition, the configuration in which the bypass channel part further includes another pressure reduction channel part (third pressure reduction channel part 181) for forming another pressure reduction channel that allows irrigation liquid to flow toward valve seat part 185 while reducing the pressure of the irrigation liquid is further advantageous from the viewpoint of handling higher outer liquid pressure to discharge irrigation liquid.

In addition, the configuration in which the water intake part includes the screen part including slit 151 that opens to the interior of tube 110 is further advantageous from the viewpoint of preventing clogging of the channel in emitter 120 with floating matters in the irrigation liquid.

In addition, the configuration in which the discharging part includes an intrusion preventing part for preventing intrusion of foreign matters into discharging port 112 is further advantageous from the viewpoint of preventing closing of the channel in emitter 120 and damaging of emitter 120 due to intrusion of the foreign matter.

In addition, the configuration in which emitter 120 is integrally molded with a resin material having flexibility is further advantageous from the viewpoint of enhancing the productivity of emitter 120 by facilitating assembly and increasing assembly precision.

In addition, drip irrigation tube 100 includes tube 110 including discharging port 112 for discharging irrigation liquid, and emitter 120 joined at a position corresponding to discharging port 112 on the inner wall surface of tube 110. Accordingly, the irrigation liquid can be quantitatively discharged even when the pressure of the irrigation liquid is low, and fluctuations of the discharge rate of the irrigation liquid can be suppressed when the pressure of the irrigation liquid is high.

While first groove 177 and second groove 178 have identical sizes, first groove 177 and second groove 178 may have different sizes and shapes as long as the total cross-sectional area of the groove of the projection decreases in the order of the close contact of film 140 with the projections. For example, as long as the total cross-sectional area of the groove of the projection decreases in the order of the close contact of the film, the projections may have grooves of different numbers and/or different sizes, or may have the same number of grooves of different sizes.

(Second Embodiment)

Figure 8A:
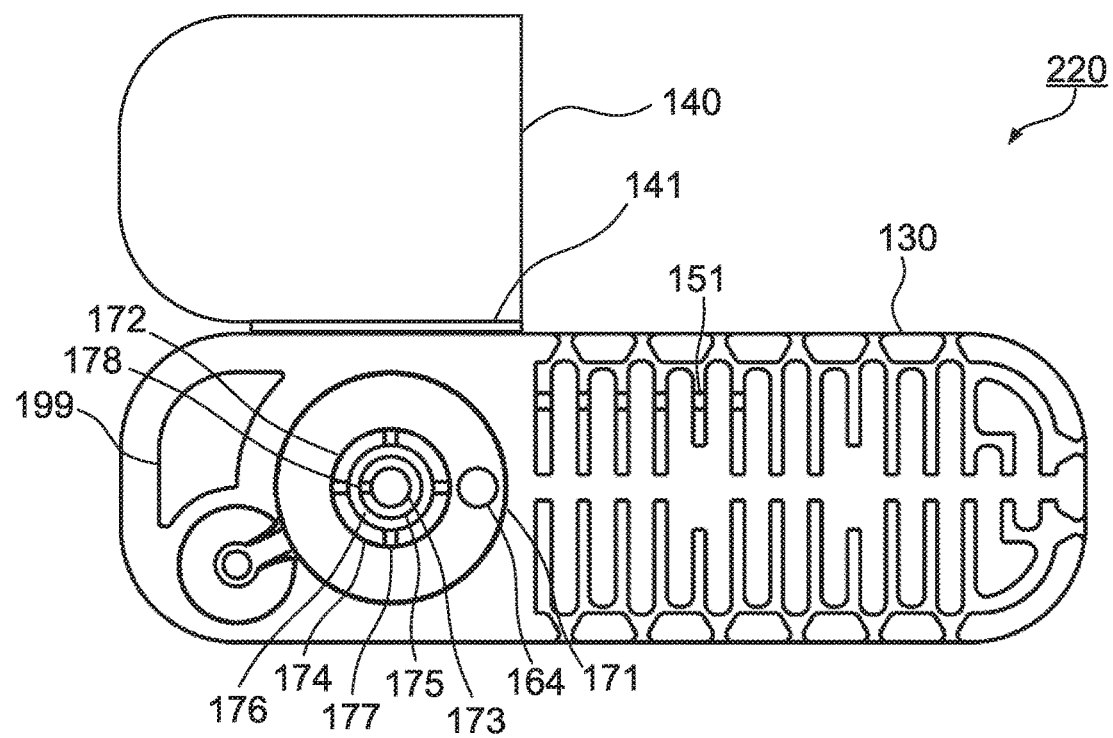
FIG. 8A is a plan view of an emitter according to the second embodiment of the present invention before the film is joined.
Figure 8B:
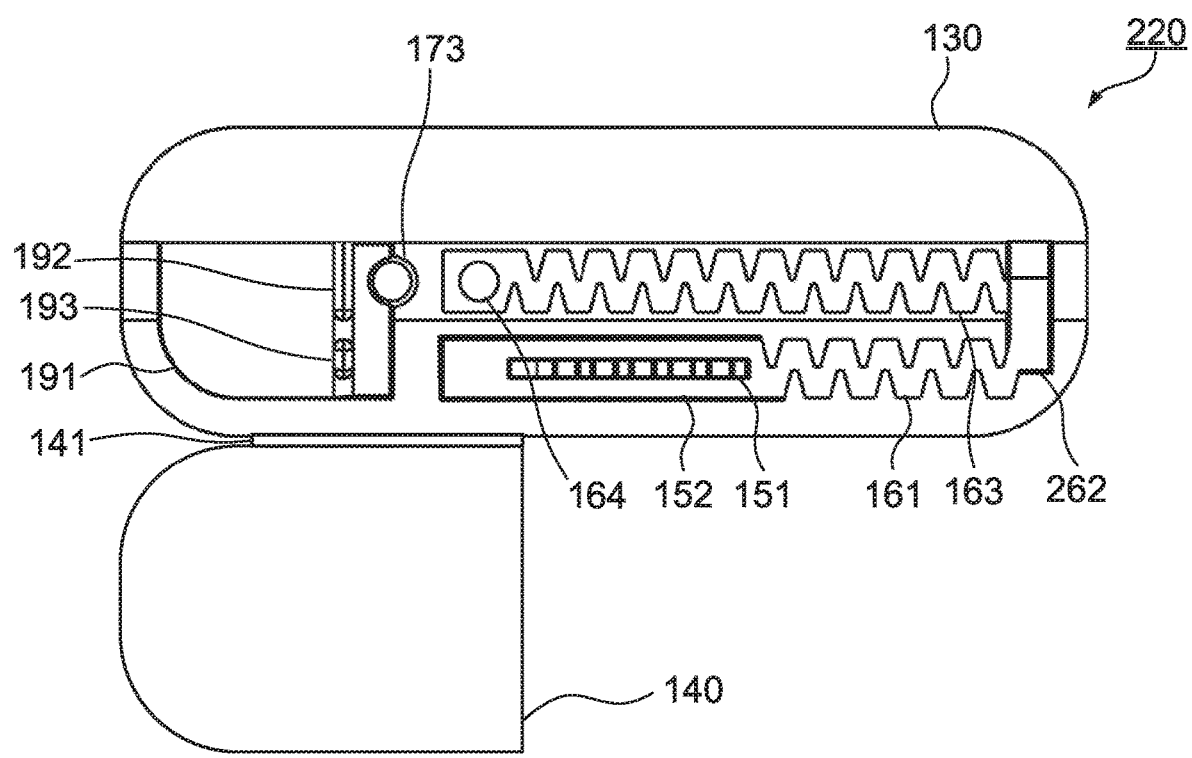
FIG. 8B is a bottom view of the emitter before the film is joined.

FIG. 8A and FIG. 8B illustrate emitter 220 according to the second embodiment of the present invention. FIG. 8A is a plan view of emitter 220 before film 140 is joined, and FIG. 8B is a bottom view of emitter 220 before the film is joined. As illustrated in FIG. 8A and FIG. 8B, the configuration of emitter 220 is roughly the same as that of emitter 120 except that emitter 220 includes recess 262 that couples first pressure reduction channel part 161 and second pressure reduction channel part 163 in place of recess 162, that is, emitter 220 does not include the bypass channel.

Emitter 220 adjusts the discharge rate of the irrigation liquid in the same manner as emitter 120 except that the irrigation liquid is not supplied from the bypass channel to recess 171 when the outer liquid pressure is sufficiently low. Accordingly, emitter 220 and the drip irrigation tube including emitter 220 achieve an effect identical to that of the effect of the first embodiment except for the effect of increasing the discharge rate of the irrigation liquid under a low pressure.

(Third embodiment)

Figure 9A:
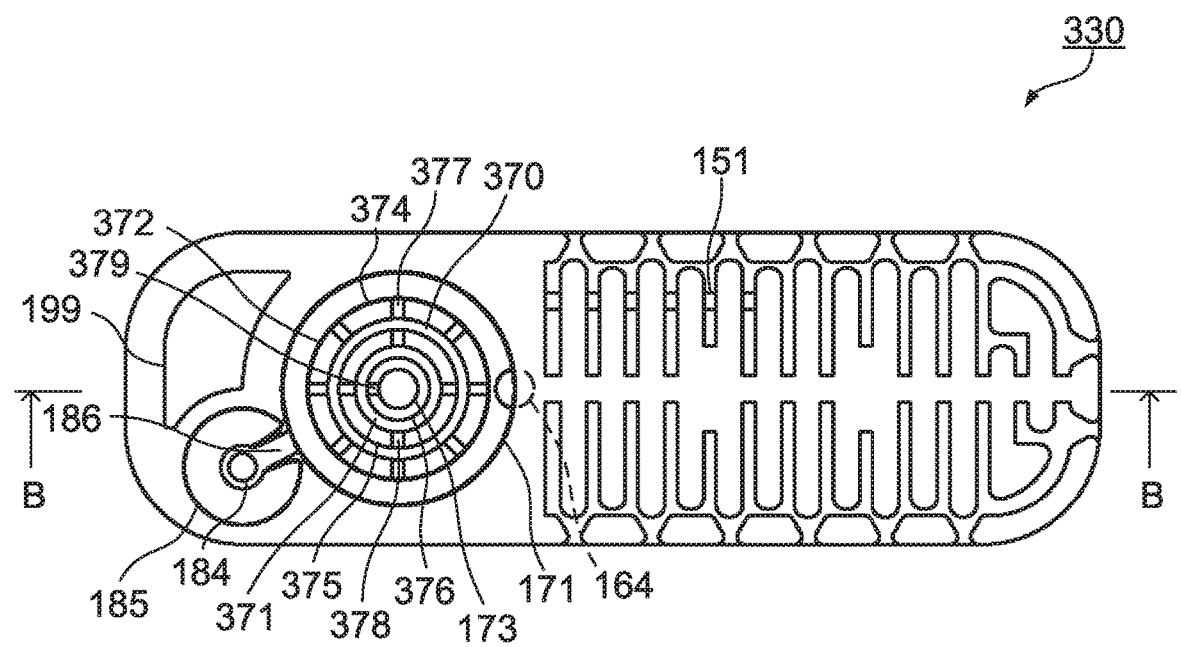
FIG. 9A is a plan view of an emitter main body of a third embodiment of the present invention.
Figure 9B:
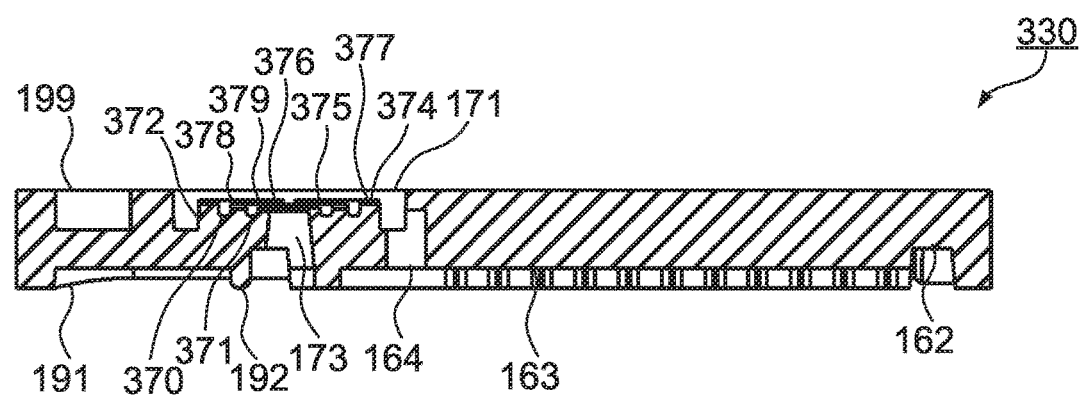
FIG. 9B is a cross-sectional view of the emitter main body taken along line B-B of FIG. 9A.

FIG. 9A and FIG. 9B illustrate an emitter according to the third embodiment of the present invention. FIG. 9A is a plan view of emitter main body 330 of the emitter according to the present embodiment, and FIG. 9B is a cross-sectional view of emitter main body 330 taken along line B-B of FIG. 9A. The configuration of the emitter is the same as that of emitter 120 except that the emitter includes projection 372 including triple projections in place of projection 172 and that hole 164 opens at a position where hole 164 overlaps the edge of recess 171 in plan view.

Projection 372 includes first projection 374, second projection 375 and third projection 376. Each of first projection 374, second projection 375 and third projection 376 is a projection disposed on the top surface of projection 372 and having an annular shape in plan view. First projection 374 is the outermost projection, second projection 375 is a projection disposed on the inner side of first projection 374, and third projection 376 is the innermost projection.

First projection 374 is higher than second projection 375, and second projection 375 is higher than third projection 376. For example, the distance from the top surface of emitter main body 330 to the top surface of first projection 374 is 0.24 mm, and the distance from the top surface of emitter main body 330 to the top surface of second projection 375 is 0.35 mm, and, the distance from the top surface of emitter main body 330 to the top surface of third projection 376 is 0.45 mm The heights of the projections are set such that film 140 that is deflected under the outer liquid pressure sequentially makes close contact with first projection 374, second projection 375 and third projection 376 in this order.

In addition, the widths of first projection 374, second projection 375, and third projection 376 are 0.5 mm, 0.4 mm, and 0.3 mm, respectively. Further, the distance between the center of first projection 374 in the width direction and the center of second projection 375 in the width direction is 0.75 mm, and the distance between the center of second projection 375 in the width direction and the center of third projection 376 in the width direction is 0.65 mm Recess 370 is formed as a gap between first projection 374 and second projection 375, and recess 371 is formed as a gap between second projection 375 and third projection 376.

Eight first grooves 377 are formed at even intervals on first projection 374. Four second grooves 378 are formed at even intervals on second projection 375. One third groove 379 is formed on third projection 376. For example, first grooves 377, second grooves 378 and third groove 379 have identical sizes with a depth of 0.1 mm and a width of 0.3 mm The total cross-sectional area of first groove 377 in first projection 374 is eight times the total cross-sectional area of third groove 379 in third projection 376, and the total cross-sectional area of second groove 378 in second projection 375 is four times the total cross-sectional area of third groove 379 in third projection 376. In this manner, first groove 377, second groove 378 and third groove 379 are respectively formed on first projection 374, second projection 375 and third projection 376 such that the total cross-sectional area of the groove of one projection decreases in the order of the close contact of the projections with film 140.

The emitter operates in the same manner as emitter 120 except that film 140 makes close contact with first projection 374, second projection 375 and third projection 376 in this order as the outer liquid pressure increases. That is, the emitter includes a mechanism that reduces, three times in the discharge rate adjusting part or four times when the bypass channel is included, the increase in flow rate of the irrigation liquid associated with the increase in outer liquid pressure. Accordingly, the emitter according to the present embodiment and the drip irrigation tube including the emitter can achieve an effect of handling further higher outer liquid pressure to adjust the discharge rate of the irrigation liquid to a desired rate in comparison with emitter 120, in addition to the effect of the first embodiment.

It is to be noted that, as is clear from the present embodiment, the number of the projections in the discharge rate adjusting part may be appropriately set as long as a plurality of projections are provided and as long as the number is acceptable in consideration of the configuration of the emitter. Thus, the emitter of the embodiment of the present invention can reduce the flow rate of the irrigation liquid at the discharge rate adjusting part by the number of the projections, and can handle further higher outer liquid pressure to adjust the discharge rate of the irrigation liquid to a desired rate.

(Fourth Embodiment)

Figure 10A:
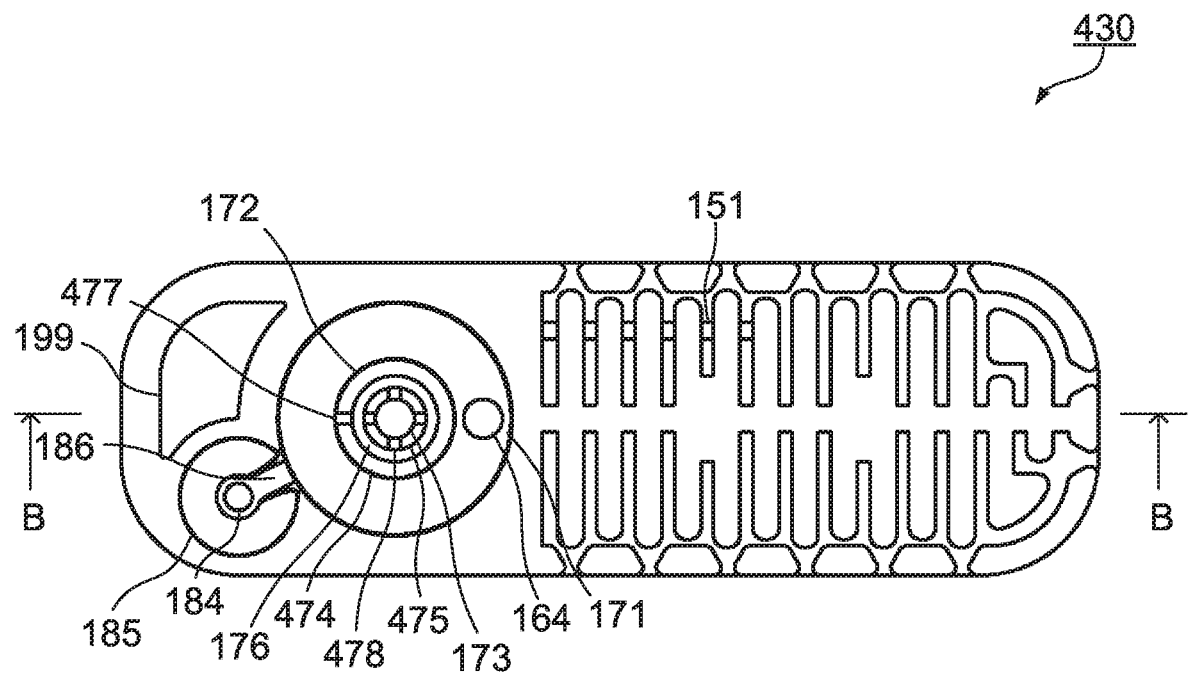
FIG. 10A is a plan view of an emitter main body of a fourth embodiment of the present invention.
Figure 10B:
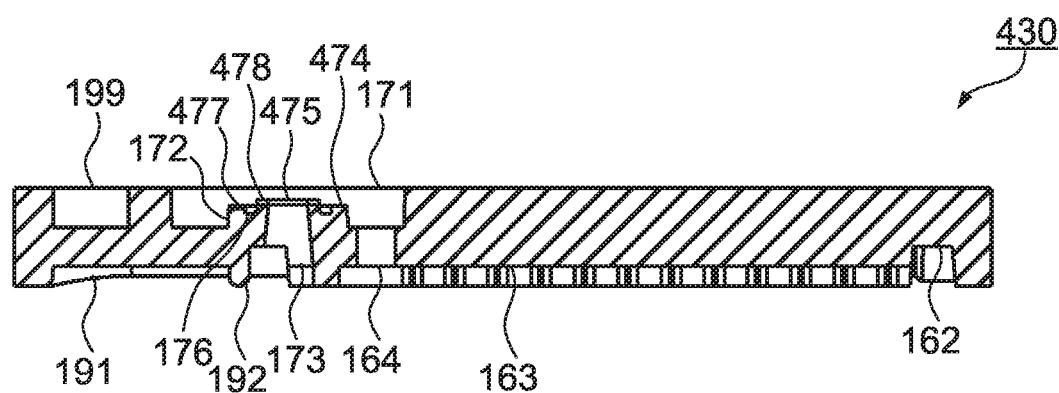
FIG. 10B is a cross-sectional view of the emitter main body taken along line B-B of FIG. 10A.

FIG. 10A and FIG. 10B illustrate an emitter according to the fourth embodiment of the present invention. FIG. 10A is a plan view of emitter main body 430 of the emitter according to the present embodiment, and FIG. 10B is a cross-sectional view of emitter main body 430 taken along line B-B of FIG. 10A. The configuration of the emitter is the same as that of emitter 120 except that the emitter includes first projection 474 and second projection 475 in place of first projection 174 and second projection 175.

Projection 172 includes first projection 474 and second projection 475. Each of first projection 474 and second projection 475 is a projection disposed on the top surface of projection 172 and having an annular shape in plan view. First projection 474 is a projection on the outer side, and second projection 475 is a projection on the inner side.

Second projection 475 is higher than first projection 474. For example, the height of first projection 474 from the top surface of projection 172 is 0.45 mm, and the height of second projection 475 from the top surface of projection 172 is 0.3 mm The heights of the projections are set such that film 140 that is deflected under the outer liquid pressure sequentially makes close contact with second projection 475 and first projection 474 in this order. The widths and the distance between the centers in the width direction of first projection 474 and second projection 475 are identical to those of the first embodiment.

One first groove 477 is formed on first projection 474, and four second grooves 478 are formed on second projection 475 at even intervals. For example, first groove 477 and second groove 478 have identical sizes with a depth of 0.1 mm and a width 0.3 mm The total cross-sectional area of second grooves 478 is four times the total cross-sectional area of first groove 477 of first projection 474. That is, in the emitter, the number of the grooves in one projection is larger in the projection on the inner side. In addition, first groove 477 and second groove 478 are respectively formed on first projection 474 and second projection 475 such that the total cross-sectional area of the groove of one projection decreases in the order of the close contact of the projections with film 140.

The emitter operates in the same manner as emitter 120 except that the film 140 makes close contact with second projection 475 and first projection 474 in this order as the outer liquid pressure increases. That is, the emitter includes a mechanism that reduces, two times in the discharge rate adjusting part or three times when the bypass channel is included, the increase in flow rate of the irrigation liquid associated with the increase in outer liquid pressure. Accordingly, the emitter according to the present embodiment and the drip irrigation tube including the emitter can also achieve an effect identical to that of the first embodiment.

This application is entitled to and claims the benefit of Japanese Patent Application No. 2015-108622 dated May 28, 2015, the disclosure of which including the specification, drawings and abstract is incorporated herein by reference in its entirety.

INDUSTRIAL APPLICABILITY

According to the present invention, an emitter which can drop liquid with an appropriate rate by the pressure of the liquid to be dropped can be easily provided. Accordingly, popularization of the emitter in the technical fields of drip irrigations and endurance tests where long-term dropping is required, and development in the technical fields can be expected.

REFERENCE SIGNS LIST

100 Drip irrigation tube
110 Tube
112 Discharging port
120, 220 Emitter
130, 330, 430 Emitter main body
140 Film
141 Hinge part
142 First diaphragm part
143 Second diaphragm part
151 Slit
152, 162, 171, 191, 199, 262 Recess
161 First pressure reduction channel part
163 Second pressure reduction channel part
164, 173, 184 Hole
172, 372 Projection
174, 374, 474 First projection
175, 375, 475 Second projection
176, 370, 371 Recess
177, 377, 477 First groove
178, 378, 478 Second groove
181 Third pressure reduction channel part
182 Groove
183 Projection
185 Valve seat part
186 Guide groove
192 Main-projection
193 Sub-projection
376 Third projection
379 Third groove

The invention claimed is:

1. An emitter configured to be joined on an inner wall surface of a tube for carrying irrigation liquid at a position corresponding to a discharging port communicating between inside and outside of the tube, the emitter being configured to quantitatively discharge the irrigation liquid in the tube from the discharging port to the outside of the tube, the emitter comprising:
   a water intake part for intake of the irrigation liquid in the tube;
   a first pressure reduction channel part for forming a first pressure reduction channel that allows the irrigation liquid received at the water intake part to flow therethrough while reducing a pressure of the irrigation liquid received at the water intake part;
   a discharge rate adjusting part for controlling a flow rate of the irrigation liquid supplied from the first pressure reduction channel in accordance with a pressure of the irrigation liquid in the tube; and
   a discharging part for housing the irrigation liquid supplied from the discharge rate adjusting part, the discharging part being configured to face the discharging port, wherein:
   the discharge rate adjusting part includes:
      a hole for communicating between the first pressure reduction channel and the discharging part,
      a plurality of projections surrounding an edge of the hole,
      at least one groove formed on each of the plurality of projections to traverse the each of the plurality of projections, and
      a film having flexibility, the film being disposed such that the film is separated from the plurality of projections and is capable of making close contact with the plurality of projections,
   the film sequentially makes close contact with the plurality of projections when the pressure of the irrigation liquid in the tube is equal to or greater than a set value,
   heights of the plurality of projections are set such that the film sequentially makes close contact with the plurality of projections and that a height of one of the plurality of projections on an outer side is greater than a height of another of the plurality of projections on an inner side,
   the at least one groove is formed on each of the plurality of projections such that a total cross-sectional area of the at least one groove in each of the plurality of projections decreases in an order of close contact of the plurality of projections with the film,
   the at least one groove has identical widths and identical depths, and a number of the at least one groove in one projection is greater in the projection on the outer side than in the projection on the inner side.

2. The emitter according to claim 1, further comprising a bypass channel part for forming a bypass channel that bypasses a part or all of the first pressure reduction channel part and communicates between an upstream side of the discharge rate adjusting part and the water intake part, wherein the bypass channel part includes a valve seat part capable of making close contact with the film under the pressure of the irrigation liquid in the tube such that the film closes the bypass channel.

3. The emitter according to claim 2, wherein the bypass channel part further includes a guide groove for guiding, to the upstream side of the discharge rate adjusting part, the irrigation liquid supplied to the valve seat part.

4. The emitter according to claim 2, wherein the bypass channel part further includes a second pressure reduction channel part for forming a second pressure reduction channel configured to allow the irrigation liquid to flow toward the valve seat part while reducing the pressure of the irrigation liquid.

5. The emitter according to claim 1, wherein the water intake part includes a screen part including a slit that opens to the inside of the tube.

6. The emitter according to claim 1, wherein the discharging part includes an intrusion preventing part for preventing intrusion of foreign matters from the discharging port.

7. The emitter according to claim 1, wherein the emitter is integrally molded with a resin material having flexibility.

8. A drip irrigation tube comprising:
the tube including the discharging port for discharging irrigation liquid; and
the emitter according to claim 1 joined on the inner wall surface of the tube at a position corresponding to the discharging port.

* * * * *